United States Patent
Sakamoto et al.

(10) Patent No.: US 6,653,424 B1
(45) Date of Patent: Nov. 25, 2003

(54) NORBORNENE OPEN-RING POLYMERS, PRODUCTS OF HYDROGENATION THEREOF AND PROCESSES FOR THE PRODUCTION OF BOTH

(75) Inventors: Masato Sakamoto, Kawasaki (JP); Daisuke Uchida, Kawasaki (JP); Yasuo Tsunogae, Kawasaki (JP); Hiroshi Kurakata, Kawasaki (JP)

(73) Assignee: Zeon Corporation, Tokyo (JP)

( * ) Notice: Subject to any disclaimer, the term of this patent is extended or adjusted under 35 U.S.C. 154(b) by 81 days.

(21) Appl. No.: 10/049,648

(22) PCT Filed: Aug. 25, 2000

(86) PCT No.: PCT/JP00/05724
§ 371 (c)(1),
(2), (4) Date: Feb. 25, 2002

(87) PCT Pub. No.: WO01/14446
PCT Pub. Date: Mar. 1, 2001

(30) Foreign Application Priority Data

Aug. 25, 1999 (JP) .................................. 11-237990

(51) Int. Cl.$^7$ ............................. C08F 32/08; C08F 8/04
(52) U.S. Cl. ................... 526/282; 526/170; 526/172; 526/281; 525/332.1; 525/338; 525/339
(58) Field of Search .................... 526/281, 283, 526/170, 172; 525/332.1, 338, 339

(56) References Cited

U.S. PATENT DOCUMENTS 5,194,534 A * 3/1993 Bell .......................... 526/161
6,310,160 B1 * 10/2001 Kodemura ................. 526/281

FOREIGN PATENT DOCUMENTS

JP 53-017700 2/1978
WO WO99/20676 4/1999

OTHER PUBLICATIONS

USSN 09/530,116—Corresponds to AF above. Includes Article 34 Amendment.

T.A. Davidson, "The polymerization of dicyclopentadiene: an investigation of mechanism," J.Molecular Catalysis A: Chemical 133 (1998) pp. 67–74.

Ezat Khosravi, "Recent Developments in the Synthesis of Fluorinated Homopolymers and Block Copolymers via Living Ring Opening Metathesis Polymerization", Metathesis Polymerization of Olefins, pp. 265–276 (1998).

M. Hashimoto, Sythesis and Properties of Hydrogenated Ring Opening Metathesis Polymer; Polymeric Material Sc.&Eng. vol 76, p61.

International Search Report dated Nov. 28, 2000.

* cited by examiner

Primary Examiner—Fred Teskin
(74) Attorney, Agent, or Firm—Armstrong, Westerman & Hattori, LLP

(57) ABSTRACT

Using a polymerization catalyst comprising as a main ingredient a metal compound containing a transition metal of group 6 of the periodic table and having at least one imide group and at least two substituent (A) selected from the group consisting of an alkoxy group, an aryloxy group, an alkylamide group and an arylamide group, a polycyclic norbornene monomer is polymerized to give a ring-opened norbornene polymer having a weight average molecular weight of 500 to 1,000,000 as expressed in terms of polystyrene and a melting point of 140° C. or higher. This polymer is hydrogenated to give a hydrogenated product having a melting point of 140° C. or higher.

26 Claims, 1 Drawing Sheet

NORBORNENE OPEN-RING POLYMERS, PRODUCTS OF HYDROGENATION THEREOF AND PROCESSES FOR THE PRODUCTION OF BOTH

TECHNICAL FIELD

This invention relates to a crystalline ring-opened norbornene polymer having improved processability and shapability; a crystalline hydrogenation product of ring-opened norbornene polymer; and processes of the polymer and the hydrodrogenation product thereof.

BACKGROUND ART

Ring-opened norbornene polymers and hydrogenation products thereof are known as non-crystalline polymers. For Example, a polymer of dicyclopentadiene, i.e., a tricyclic norbornene monomer, is reported which is made by polymerization conducted by using a catalyst $Mo(N-2,6-C_6H_3-i-Pr)-(CHC(CH_3)_2Ph)$ $(OCCH_3(CF_3)_2)_2$ [for example, J. Mol. Cat. A:Chem., 133, 67–74 (1998)]. According to the analysis carried out by the present inventors, this polymer was proved not to possess a melting point and was a non-crystalline polymer.

This polymer exhibits good transparency, heat resistance, birefringence, and processability and shapability. Therefore, it was proposed to use this polymer as a material for optical disks and optical lenses. Further, this polymer exhibits reduced dielectric and enhanced chemical resistance. Therefore, it was also proposed to apply this polymer in fields other than optical applications. However, this polymer is often unsuitable for use in a field in which high mechanical strength and high solvent resistance are required.

A part of ring-opened norbornene polymers and their hydrogenation products are crystalline. For example, a hydrogenation product of ring-opened polymer of 2-norbornene which is a dicyclic norbornene monomer was reported as a crystalline polymer having a melting point of 116° C. (Polymeric Materials Science and Engineering, vol. 76, p61 (1997), American Chemical Society. The melting point of this hydrogenation product was very low and thus the heat resistance was poor.

Further, it was reported that a polymer made by polymerizing 5-trifluoromethyl-5,6,6-trifluoro-2-norbornene by using a catalyst $Mo(N-2,6-C_6H_3-i-Pr)(CHC(CH_3)_3)(OC(CH_3)_3)_2$ was a crystalline polymer having a melting point of 218° C. (Metathesis Polymerization of Olefins and Polymerization of Alkynes, NATO ASI Series, p265–276 (1998), Kluwer Academic Publishers). This crystalline polymer tends to be of poor utility for use for which high mechanical strength, good solvent resistance and high heat resistance are required.

In Japanese Unexamined Patent Publication No. S53-17700, a dicyclopentadiene polymer which was crystalline or crosslinked was referred to as an explanation of prior art. This polymer was reported in this publication as being carbonized and decomposed without melting upon heating to a temperature of 200° C. to 400° C., and thus, as possessing no practical utility and being incapable of being melt-shaped by an ordinary shaping method.

DISCLOSURE OF THE INVENTION

A primary object of the present invention, there are provided a crystalline ring-opened norbornene polymer and a hydrogenation product thereof, which have high mechanical strength, good chemical resistance, good processability and shapability, and high heat resistance; and a process for producing the norbornene polymer and hydrogenation product thereof.

By research to solve the problems of prior art, the present inventors found that, when a polycyclic norbornene monomer such as dicyclopentadiene is polymerized by using a polymerization catalyst comprising as a main ingredient a metal complex containing a transition metal of group 6 of the periodic table and having specific substituents, a ring-opened norbornene polymer is obtained which is a thermoplastic straight-chain ring-opened polymer exhibiting high stereoregularity and having crystallinity and being soluble in chloroform and other solvents; that a hydrogenation product of the ring-opened polymer also is crystalline; and further that the ring-opened polymer and the hydrogenation product thereof have good processability and shapability, high mechanical strength, good heat resistance and good chemical resistance.

Further, it was found that, when a polycyclic norbornene monomer is polymerized by using a polymerization catalyst comprising as a main ingredient a metal complex containing a transition metal of group 6 of the periodic table and having other specific substituents, a ring-opened norbornene polymer is obtained which is non-crystalline but, when hydrogenated, gives a crystalline hydrogenation product.

Still further, it was found that, in the case where a crystalline hydrogenation product of ring-opened norbornene polymer comprising norbornene monomer units is produced, when a polymerization catalyst comprising as a main ingredient a metal complex containing a transition metal of group 6 of the periodic table and having specific substituents is used, the resulting hydrogenation product exhibits higher stereoregularity and has a melting point much higher than those of the known hydrogenation products of ring-opened norbornene polymers.

Based on the above-mentioned findings, the present invention has been completed.

Thus, in one aspect of the present invention, there is provided a ring-opened norbornene polymer comprising at least 10% by mol of repeating units derived from a polycyclic norbornene monomer having at least three rings, in the repeating units of the polymer, said polymer having a weight average molecular weight in the range of 500 to 1,000,000 as measured by gel permeation chromatography and expressed in terms of polystyrene, and having a melting point.

In another aspect of the present invention, there is provided a hydrogenation product of a ring-opened norbornene polymer obtained by hydrogenating a ring-opened norbornene polymer comprising repeating units derived from a polycyclic norbornene monomer, said hydrogenation product having a weight average molecular weight in the range of 500 to 1,000,000 as measured by gel permeation chromatography and expressed in terms of polystyrene, and having a melting point of 140° C. or higher.

In still another aspect of the present invention, there is provided a hydrogenation product of a ring-opened norbornene polymer obtained by hydrogenating a ring-opened norbornene polymer comprising at least 10% by mol of repeating units derived from a polycyclic norbornene monomer having at least three rings, in the repeating units of the polymer; said hydrogenation product having a weight average molecular weight in the range of 500 to 1,000,000 as measured by gel permeation chromatography and expressed in terms of polystyrene, and having a melting point.

In a further aspect of the present invention, there is provided a hydrogenation product of a ring-opened norbornene polymer obtained by hydrogenating a ring-opened norbornene polymer comprising repeating units derived from a polycyclic norbornene monomer having two rings in the repeating units of the polymer; said hydrogenation product having a weight average molecular weight in the range of 500 to 1,000,000 as measured by gel permeation chromatography and expressed in terms of polystyrene, and having a melting point of 140° C. or higher.

In further aspects of present invention, there are provided processes for producing the above-mentioned ring-opened norbornene polymer and hydrogenation products thereof, which comprise a step of polymerization carried out by using a polymerization catalyst comprising as a main ingredient a metal compound containing a transition metal of group 6 of the periodic table and having at least one imide group and at least one substituent (A) selected from the group consisting of an alkoxy group, an aryloxy group, an alkylamide group and an arylamide group.

BEST MODE FOR CARRYING OUT THE INVENTION

Figure 1:
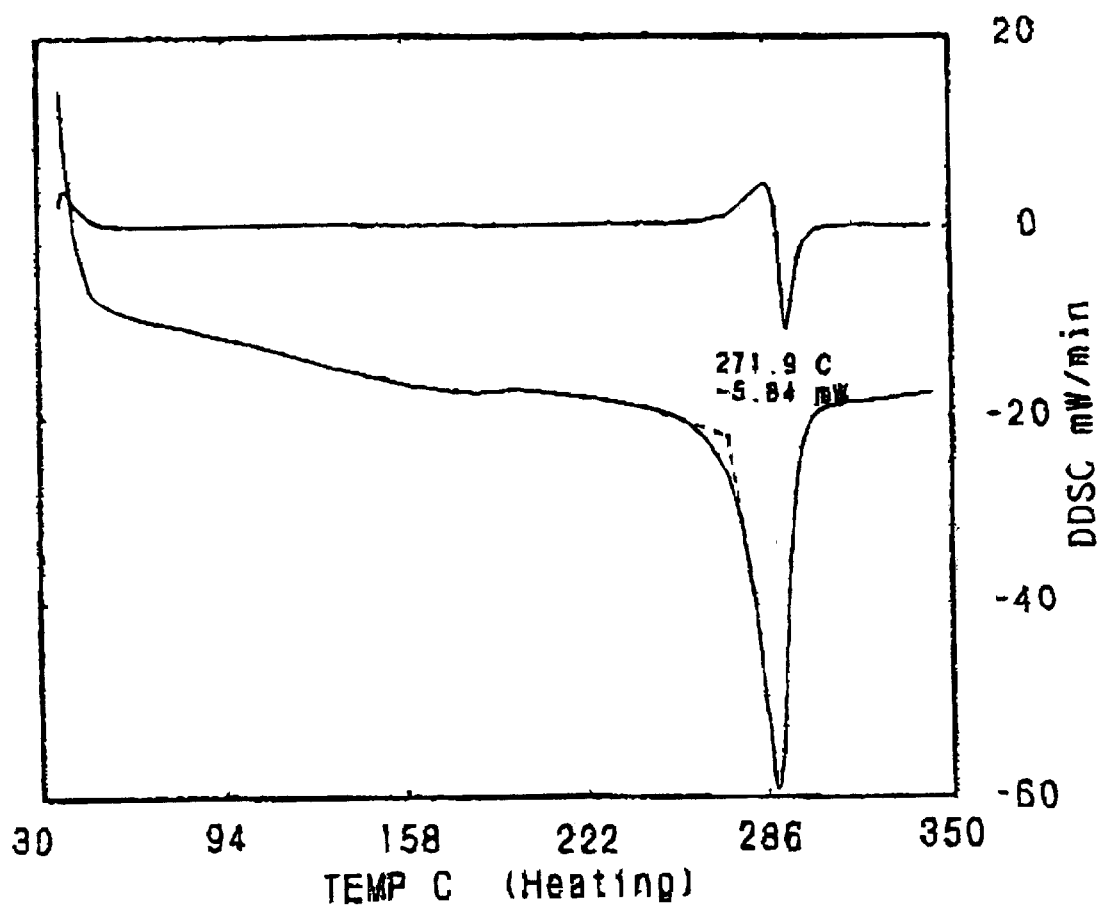
FIG. 1 is a DSC chart drawn by measurement of melting point of a hydrogenation product of polymer, made in Example 2.

Preferred embodiments of the present invention will be described in order.

The ring-opened norbornene polymer of the present invention comprises repeating units derived from a polycyclic norbornene monomer in the repeating units of polymer.

The repeating units derived from a polycyclic norbornene monomer include those of a monomer having at least three rings and those of a monomer having two rings.

The ring-opened norbornene polymer of the present invention comprises at least 10% by mol of repeating units derived from a polycyclic norbornene monomer having at least three rings, in the repeating units of the polymer, and has a weight average molecular weight in the range of 500 to 1,000,000 as measured by gel permeation chromatography and expressed in terms of polystyrene, and has a melting point.

The polycyclic norbornene monomer having at least three rings is a norbornene monomer having at least one ring in addition to the two rings constituting the norbornene ring. Usually, the polycyclic norbornene monomer has a fused ring structure such that at least two carbon atoms on the norbornene ring have substituents which are bonded to each other to form a ring. The repeating units of polycyclic norbornene monomer having at least three rings preferably include those which are represented by the following formula (1) or (2):

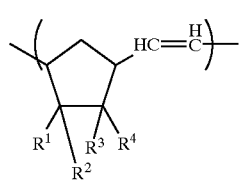

(1)

wherein $R^1$ through $R^4$ independently represent a hydrogen atom or a hydrocarbon group having 1 to 20 carbon atoms, which hydrocarbon group may have a substituent containing a halogen atom, a silicon atom, an oxygen atom or a nitrogen atom, or $R^1$ through $R^4$ are a substituent containing a halogen atom, a silicon atom, an oxygen atom or a nitrogen atom. Preferably, $R^1$ through $R^4$ independently represent a hydrogen atom or an unsubstituted hydrocarbon group having 1 to 20 carbon atoms. $R^1$ and $R^3$ are bonded together to form a ring, and $R^2$ and $R^4$ may be bonded together to form a ring.

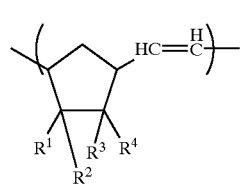

(2)

wherein $R^5$ through $R^8$ independently represent a hydrogen atom or a hydrocarbon group having 1 to 20 carbon atoms, which hydrocarbon group may have a substituent containing a halogen atom, a silicon atom, an oxygen atom or a nitrogen atom, or $R^1$ through $R^4$ are a substituent containing a halogen atom, a silicon atom, an oxygen atom or a nitrogen atom. Preferably, $R^1$ through $R^4$ independently represent a hydrogen atom or an unsubstituted hydrocarbon group having 1 to 20 carbon atoms. $R^5$ and $R^7$ may be bonded together to form a ring. m is an integer of 1 or 2.

Among the units derived from a polycyclic norbornene monomer having at least three rings used in the present invention, units derived from a polycyclic norbornene monomer having three rings are preferable. Units derived from dicyclopentadiene is especially preferable.

The content of repeating units derived from a polycyclic norbornene monomer having at least three rings, based on the repeating units of ring-opened polymer, is at least 10% by mol, preferably at least 20% by mol and more preferably at least 50% by mol. When the content of polycyclic norbornene monomer units is large, the ring-opened polymer exhibits high crystallinity.

The polycyclic norbornene monomer having two rings is a norbornene monomer having two rings constituting the norbornene ring. The repeating units of polycyclic norbornene monomer having two rings include, for example, those which are represented by the following formula (3):

(3)

wherein $R^1$ through $R^4$ independently represent a hydrogen atom or a hydrocarbon group having 1 to 20 carbon atoms, which hydrocarbon group may have a substituent containing a halogen atom, a silicon atom, an oxygen atom or a nitrogen atom, or $R^1$ through $R^4$ are a substituent containing a halogen atom, a silicon atom, an oxygen atom or a nitrogen atom. Preferably, $R^1$ through $R^4$ independently represent a hydrogen atom or an unsubstituted hydrocarbon group having 1 to 20 carbon atoms, and $R^1$ through $R^4$ are not bonded together to form a ring.

The ring-opened polymer of the present invention is preferably a straight-chain ring-opened polymer, i.e., thermoplastic ring-opened polymer.

The ring-opened polymer of the present invention has a weight average molecular weight in the range of 500 to 1,000,000, preferably 1,000 to 600,000 and more preferably 5,000 to 400,000, as measured by gel permeation chromatography (GPC) and expressed in terms of polystyrene. When Mw is too low, the mechanical strength is reduced. In contrast, when Mw is too high, the processability and shapability are reduced.

The ring-opened polymer of the present invention has a melting point. By the term "melting point" we mean a temperature at which the crystal melts. The melting point can be measured by examining the heat-absorption peak occurring due to melting of the crystalline ingredient of polymer, by using a differential scanning calorimeter. The ring-opened polymer of the present invention usually has a melting point of at least 140° C., preferably 140° C. to 400° C. and more preferably 150° C. to 300° C. As the polymer is molten when heated to a temperature higher than the melting point, the polymer can be easily shaped by an ordinary heat-melt shaping procedure.

The ring-opened polymer of the present invention exhibits good resistance to chemicals. For example, the polymer is insoluble or only slightly soluble In organic solvents at room temperature, which include aliphatic hydrocarbons such as pentane, hexane and heptane; alicyclic hydrocarbons such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene and cyclooctane; aromatic hydrocarbons such as benzene, toluene and xylene; and ethers such as diethyl ether and tetrahydrofuran.

The hydrogenation product of a ring-opened norbornene polymer of the present invention is a hydrogenation product made by hydrogenating a ring-opened polymer comprising repeating units of a polycyclic norbornene monomer, and the hydrogenation product has a melting point. The ring-opened polymer comprising repeating units of a polycyclic norbornene monomer before hydrogenation may or may not have a melting point, provided that the hydrogenation product has a melting point. Hydrogenation percentage is preferably at least 70%, more preferably at least 80% and especially preferably at least 90% in view of enhanced heat resistance. The hydrogenation product of ring-opened norbornene polymer of the present invention comprises repeating units of a polycyclic norbornene monomer having at least three rings and/or a polycyclic norbornene monomer having two rings The hydrogenation product of a ring-opened norbornene polymer of the present invention usually has a melting point of at least 140° C., preferably 140° C. to 400° C. and more preferably 150° C. to 300° C. The hydrogenation product has good melt-shapability and good chemical resistance, which are similar to those of the non-hydrogenated ring-opened norbornene polymer.

The hydrogenation product of a ring-opened norbornene polymer has a weight average molecular weight in the range of 500 to 1,000,000, preferably 1,000 to 600,000 and more preferably 5,000 to 400,000, as measured by GPC and expressed in terms of polystyrene.

In the process for producing a ring-opened norbornene polymer according to the present invention, polymerization is carried out by using a specific polymerization catalyst. The polymerization catalyst comprises as a main ingredient a metal compound containing a transition metal of group 6 of the periodic table and having at least one imide group and at least one substituent (A) selected from the group consisting of an alkoxy group, an aryloxy group, an alkylamide group and an arylamide group.

More specifically, the polymerization catalyst includes, for example, metal compounds represented by the following formulae (4) and (5).

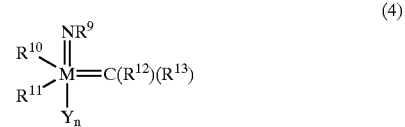

(4)

wherein $R^9$ is an alkyl group or an aryl group, and $R^{10}$ and $R^{11}$ independently represent an alkoxy group, an aryloxy group, an alkylamide group or an arylamide group, and $R^{10}$ and $R^{11}$ may be bonded to each other. $R^{12}$ and $R^{13}$ independently represent a hydrogen atom, an alkyl group or an aryl group. Y is an electron-donating neutral ligand. n is an integer of 0 to 2. N denotes a nitrogen atom, and M denotes a transition metal selected from group 6 metals of the periodic table.

(5)

wherein $R^{14}$ is an alkyl group or an aryl group, and $R^{15}$ and $R^{16}$ independently represent an alkoxy group, an aryloxy group, an alkylamide group or an arylamide group, and $R^{15}$ and $R^{16}$ may be bonded to each other. $X^1$ and $X^2$ independently represent a hydrogen atom, an alkyl group, an aryl group or an alkylsilyl group. Y is an electron-donating neutral ligand. n is an integer of 0 to 2. N denotes a nitrogen atom, and M denotes a transition metal selected from group 6 metals of the periodic table.

A polymerization catalyst comprising a compound represented by formula (4) is preferable for producing a ring-opened norbornene polymer and a hydrogenation product thereof, which have a high melting point of at least 140° C.

In formulae (4) and (5), the alkyl group is preferably a straight chain or branched chain alkyl group having 1 to 20 carbon atoms or a cycloalkyl group having 3 to 20 carbon atoms, and, as specific examples thereof, there can be mentioned methyl, ethyl, propyl, isopropyl, butyl, tert.-butyl and cyclohexyl groups.

The aryl group preferably has 6 to 20 carbon atoms, and, as specific examples thereof, there can be mentioned a phenyl group and a phenyl group having 1 to 5 substituents at any of 2, 3, 4, 5 and 6 positions.

The alkoxy group preferably has 1 to 20 carbon atoms, and, as specific examples thereof, there can be mentioned methoxy, ethoxy, propoxy, isopropoxy, butoxy and tert.-butoxy groups.

The aryloxy group preferably includes a phenoxy group and a phenoxy group having 1 to 5 substituents at any of 2, 3, 4, 5 and 6 positions.

As specific examples of the substituents possessed by the above-mentioned phenyl group and phenoxy group, there can be mentioned alkyl groups and cycloalkyl groups such as methyl, ethyl, propyl, isopropyl, butyl, tert.-butyl and cyclohexyl groups; aryl groups such as phenyl and naphthyl groups; alkylsilyl groups and alkylarylsilyl groups such as trimethylsilyl group and dimethylphenylsilyl group; halogene such as fluorine, chlorine, bromine and iodine; alkoxy groups such as methoxy, ethoxy and propoxy groups; cyano group; and naphthyl group and a naphthyl group having 1 to 8 substituents (which include those recited above) at any of 2 to 8 positions.

The alkylamide group is preferably an alkylamide group having an alkyl group with 1 to 20 carbon atoms, and the arylamide group is preferably an arylamide group having an aryl group with 6 to 20 carbon atoms. As specific examples of the alkylamide group and the arylamide group, there can be mentioned an N,N-dimethylamide group, an N-methyl (N-tert.-butyl)amide group, an N-methyl(N-trimethylsilyl) amide group, an N-phenyl-N-methylamide group, an N-phenyl(N-trimethylsilyl)amide group, an N-(2,6-dimethylphenyl)-N-methylamide group, an N-(2,6-diisopropylphenyl)-N-methylamide group, an N-(2,6-dimethylphenyl)-N-(trimethylsilyl)amide group and an N-(2,6-diisopropylphenyl)-N-(trimethylsilyl)amide group.

To obtain a hydrogenation product of ring-opened norbornene polymer having a melting point, substituents (A), more specifically, $R^{10}$ and $R^{11}$, or $R^{15}$ and $R^{16}$ may or may not be bonded to each other. However, to obtain a hydrogenation product of ring-opened norbornene polymer having high crystallinity and a melting point of at least 140° C., $R^{10}$ and $R^{11}$, or $R^{15}$ and $R^{16}$ are preferably bonded to each other.

In order to obtain a ring-opened norbornene polymer having a melting point of at least 140° C., a polymerization catalyst having substituents (A) bonded to each other must be used. Specific examples of the polymerization catalyst are those which are represented by formula (3) wherein $R^{10}$ and $R^{11}$ are bonded together, and represented by formula (4) wherein $R^{15}$ and $R^{16}$ are bonded together.

As specific examples of the substituents (A) bonded together wherein each substituent (A) is an alkoxy group or an aryloxy group, there can be mentioned a propyl-1,3-dioxy group, a butyl-1,4-dioxy group, a cyclohexyl-1,2-dimethoxy group, a 2,2'-biphenoxy group, 1,1'-bi-2-naphthoxy group, and dioxy groups corresponding to these dioxy groups and having a substituent as recited above as substituents for the phenyl group and the phenoxy group. As specific examples of the substituents (A) bonded together wherein each substituent (A) is an alkylamide group or an arylamide group, there can be mentioned a 1,3-propyl-N,N'-dimethyldiamide group, a 1,3-propyl-N,N'-di(trimethylsilyl)diamide group, a 1,3-propyl-bis(phenylamide) group, an N,N'-bis (trimethylsilyl)-2,2'-biphenyldiamide group, and diamide groups corresponding to these diamide groups and having a substituent as revited above as a substituent for the phenyl group and the phenoxy group. Of these, those in which each substituent (A) is an aryloxy group are preferable because the resulting ring-opened norbornene polymer and hydrogenation product thereof exhibit especially high crystallinity.

As specific examples of halogen in X of formula (4), there can be mentioned fluorine, chlorine, bromine and iodine. As specific examples of the alkylsilyl group, there can be mentioned alkylsilyl groups having an alkyl group with 1 to 20 carbon atoms, and alkylsilyl groups having both an alkyl group with 1 to 20 carbon atoms and an aryl group having 6 to 20 carbon atoms, such as a trimethylsilyl group and a dimethylphenylsilyl group.

Y in formulae (4) and (5) is an electron-donating neutral ligand which usually has a hetero atom. Y includes, for example, phospnines, ethers and amines. The phosphines include, for example, trialkylphosphines in which each alkyl group has 1 to 20 carbon atoms (a part of the three alkyl groups may be substituted by an aryl group having 6 to 20 carbon atoms), and triarylphosphines in which each aryl group has 6 to 20 carbon atoms. As specific examples of the phosphines, there can be mentioned trimethylphosphine, triisopropylphosphine, tricyclohexylphosphine and triphenylphosphine. As specific examples of the ethers, there can be mentioned diethyl ether, tetrahydrofuran and 1,2-dimethoxyethane. As specific examples of the amines, there can be mentioned trialkylamines such as trimethylamine and triethylamine, pyridine and lutidine.

In the process for producing a ring-opened polymer according to the present invention, an organometal reducing agent may be used in combination with the above-mentioned polymerization catalyst to enhance the polymerization activity. The organometal reducing agent includes organometal compounds containing a metal of group 1, 2, 12, 13 or 14 of the periodic table and having a hydrocarbon group with 1 to 20 carbon atoms. Preferable examples of the organometal compound are an organolithium, an organomagnesium, an organozinc, an organoaluminum and an organotin. An organoalumnum and an organotin are especially preferable. As specific examples of the organometal compound, there can be mentioned oraganolithiums such as n-butyllithium, methyllithium and phenyllithium; organomagnesiums such as butylethylmagnesium, butyloctylmagnesium, dihexylmagnesium, ethylmagnesium chloride, n-butylmagnesium chloride and allylmagnesium bromide; organozincs such as dimethylzine, diethylzine and diphenylzinc; organoaluminums such as trimethylaluminum, triethylaluminum, triisobutylaluminum, diethylaluminum chloride, ethylaluminum sesquichloride and ethylaluminum dichloride; and organotins such as tetramethyltin, tetra(n-butyl)tin and tetraphenyltin. The amount of organometal reducing agent is preferably in the range of 0.1 to 100 times, more preferably 0.2 to 50 times and especially preferably 0.5 to 20 times by weight of the central atom of the polymerization catalyst. When the amount of organometal reducing agent is smaller than 0.1 time by weight, the polymerization activity is not enhanced. In contrast, when the amount of organometal reducing agent is larger than 100 time by weight, side-reactions tend to occur.

The monomer used in the present invention Is a polycyclic norbornene monomer having at least three rings or a polycyclic norbornene monomer having two rings.

The polycyclic norbornene monomer having at least three rings Includes, for example, polycyclic monomers represented by the following formulae (6) and (7).

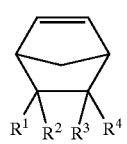

(6)

wherein $R^1$ through $R^4$ are the same as defined with regard to formula (1).

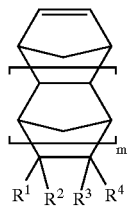

(7)

wherein $R^5$ through $R^8$ and m are the same as defined with regard to formula (2).

As specific examples of the monomers of formula (6), there can be mentioned dicyclopentadiene, tricyclo[4.3.1$^{2,5}$0.0]-deca-3-ene (i.e., dicyclopentadiene derivative having a structure such that the double bond in the five-membered ring of dicyclopentadiene has been saturated), and tricyclo-[4.4.1$^{2,5}$0.0]undeca-3-ene; and norbornene derivatives having an aromatic ring, such as tetracyclo[6.5.1$^{2,5}$0.0$^{1,6}$0.0$^{8,13}$]trideca-3,8,10,12-tetraene (which is referred to as "1,4-methano-1,4,4a, 9a-tetrahydrofluorene") and tetracyclo-[6.6.1$^{2,5}$0.0$^{1,6}$0.0$^{8,13}$]tetradeca-3,8,10,12-tetraene (which is referred to as "1,4-methano-1,4,4a, 5,10,10a-hexahydroanthracene").

The monomers of formula (7) include, tetracyclododecenes (i.e., monomers of formula (7) wherein m-is 1) and hexacyclo-heptadecenes (i.e., monomers of formula (7) wherein m is 2).

As specific examples of the tetracyclododecenes, there can be mentioned unsubstituted tetracyclododecene and substituted tetracyclododecenes having an alkyl group, such as tetracyclododecene, 8-methyltetracyclododecene, 8-ethyltetracyclododecene, 8-cyclohexyltetracyclododecene and 8-cyclopentyltetracyclododecene; tetracyclododecenes having a double bond outside the ring, such as 8-methylidene-tetracyclododecene, 8-ethylidenetetracyclododecene, 8-vinyltetracyclododecene, 8-propenyltetracyclododecene, 8-cyclohexenyltetracyclododecene and 8-cyclopentenyltetracyclododecene; tetracyclododecenes having an aromatic ring such as 8-phenyltetracyclododecene; tetracyclododecenes having a substituent containing an oxygen atom, such as 8-methoxycarbonyltetracyclododecene, 8-methyl-8-methoxycarbonyltetracyclododecene, 8-hydroxymethyl-tetracyclododecene, 8-carboxytetracyclododecene, tetracyclododecene-8,9-dicarboxylic acid and tetracyclododecene-8,9-dicarboxylic anhydride; tetracyclododecenes having a substituent containing a nitrogen atom, such as 8-cyanotetracyclododecene and tetracyclododecene-8,9-dicarboxylic acid imide; tetracyclododecenes having a substituent containing a halogen atom, such as 8-chlorotetracyclododecene; and tetracyclododecenes having a substituent containing a silicon atom, such as 8-trimethoxysilyltetracyclododecene.

As specific examples of the hexacycloheptadecenes, there can be mentioned unsubstituted hexacycloheptadecene and hexacycloheptadecenes having an alkyl group, such as hexacycloheptadecene, 12-methylhexacycloheptadecene, 12-ethylhexacycloheptadecene, 12-cyclohexylhexacycloheptadecene and 12-cyclopentylhexacycloheptadecene; hexacycloheptadecenes having a double bond outside the ring, such as 12-methylidenehexacycloheptadecene, 12-ethylidenehexacycloheptadecene, 12-vinylhexacycloheptadecene, 12-propenylhexacycloheptadecene, 12-cyclohexenyl-hexacycloheptadecene and 12-cyclopentenyl-hexacycloheptadecene; hexacycloheptadecenes having an aromatic ring such as 12-phenylhexacycloheptadecene; hexacycloheptadecenes having a substituent containing an oxygen atom, such as 12-methoxycarbonylhexacycloheptadecene, 12-methyl-12-methoxycarbonylhexacycloheptadecene, 12-hydroxymethylhexacycloheptadecene, 12-carboxyhexacycloheptadecene, hexacycloheptadecene-12,13-dicarboxylic acid and hexacycloheptadecene-12,13-dicarboxylic anhydride; hexacycloheptadecenes having a substituent containing a nitrogen atom, such as 12-cyanohexacyclo-heptadecene and hexacycloheptadecene-12,13-dicarboxylic acid imide; hexacycloheptadecenes having a substituent containing a halogen atom, such as 12-chlorohexacycloheptadecene; and hexacycloheptadecenes having a substituent containing a silicon atom, such as 12-trimethoxysilylhexacycloheptadecene.

Among the above-recited monomers, monomers of formula (6) and monomers of formula (7) wherein m is 1 are preferable in view of high crystallinity of the resulting polymer. Of these, monomers having no straight chain or branched chain substituent are more preferable. As specific examples of such preferable monomers, there can be mentioned cyclopentadiene, tricyclo-[4.3.1$^{2,5}$0.0]deca-3-ene, tetracyclo[6.5.1$^{2,5}$0.0$^{1,6}$0.0$^{8,13}$]trideca-3,8,10,12-tetraene, tetracyclo[6.6.1$^{2,5}$0.0$^{1,6}$0.0$^{8,13}$]tetradeca-3,8,10,12-tetraene, tetracyclododecene and 8-methyl-tetracyclododecene. Dicyclopentadiene is most preferable.

The above monomers include an endo isomer and an exo isomer. The monomers used in the present invention may be a mixture of these isomers. To obtain a polymer having a high crystallinity, it is preferable to use an isomer mixture comprising a predominant amount of one of the two isomers and a minor amount of the other isomer, namely, an endo isomer-rich mixture or an exo isomer-rich mixture. More specifically, the isomer mixture comprises preferably at least 70% by mole, more preferably at least 80% by mole, of one of the two isomers.

The polycyclic norbornene monomer having two rings includes, for example, polycyclic monomers represented by the following formula (8).

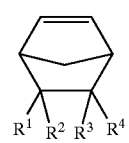

(8)

wherein $R^1$ through $R^4$ are the same as defined with regard to formula (3).

As specific examples of the monomers of formula (8), there can be mentioned unsubstituted norbornene and norbornenes having an alkyl group, such as norbornene, 5-methylnorbornene, 5-ethylnorbornene, 5-butylnorbornene, 5-hexylnorbornene, 5-decylnorbornene, 5-cyclohexylnorbornene and 5-cyclopentylnorbornene; norbornenes having an alkenyl group, such as 5-ethylidenenorbornens, 5-vinylnorbornene, 5-propenylnorbornene, 5-cyclohexenylnorbornene and 5-cyclopentenylnorbornene; norbornenes having an aromatic ring, such as 5-phenylnorbornene; norbornenes having a polar group containing an oxygen atom, such as 5-methoxycarbonylnorbornene, 5-ethoxycarbonylnorbornene, 5-methyl-5-methoxycarbonylnorbornene, 5-methyl-5-ethoxycarbonylnorbornene, norbornenyl-2-methyl propionate, norbornenyl-2-methyl octanate, norbornene-5,6-dicarboxylic anhydride, 5-hydroxymethyl-norbornene, 5,6-di(hydroxymethyl) norbornene, 5,5-di(hydroxymethyl)norbornene, 5-hydroxyisopropylnorbornene, 5,6-dicarboxynorbornene and 5-methoxycarbonyl-6-carboxynorbornene; and norbornenes having a polar group containing a nitrogen atom, such as 5-cyanonorbornene and norbornene-5,6-dicarboxylic acid imide.

In the present invention, a polycyclic norbornene monomer having at least three rings and/or a norbornene monomer having two rings may be copolymerized with at least one cycloolefin monomer copolymerizable therewith. The copolymerizable cycloolefin monomer includes a monocyclic olefin monomer.

As specific examples of the monocyclic olefin monomer, there can be mentioned monocyclic cycloolefin monomers as described in, for example, Japanese Unexamined Patent Publication No. S64-66216, such as cyclobutene, cyclopentene, methylcyclopentene, cyclohexene, methylcyclohexene, cycloheptene and cyclooctene; and cyclo-diolefin monomers as described in, for example, Japanese Unexamined Patent Publication No. H7-258318, such as cyclohexadiene, methylcyclohexadiene, cyclooctadiene, methylcyclooctadiene and phenylcyclooctadiene.

In the present invention, the polymerization can be carried out without liquid medium. However, in the case where the polymerization is followed by hydrogenation of polymer, the polymerization is preferably carried out in an organic solvent.

The organic solvent is not particularly limited provided that a ring-opened polymer and a hydrogenation product thereof are soluble or dispersible therein under certain conditions, and the organic solvent does not adversely affect the polymerization and hydrogenation. Organic solvents industrially widely used are preferable.

As specific examples of the organic solvent, there can be mentioned aliphatic hydrocarbons such as pentane, hexane and heptane; alicyclic hydrocarbons such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene and cyclooctane; aromatic hydrocarbons such as benzene, toluene and xylene; halogen-containing aliphatic hydrocarbons such as dichloromethane, chloroform and 1,2-dichloroethane; halogen-containing aromatic hydrocarbons such as chlorobenzene and dichlorobenzene; nitrogen-containing hydrocarbons such as nitromethane, nitrobenzene and acetonitrile; and ethers such as diethyl ether and tetrahydrofuran. Of these, industrially widely used aromatic hydrocarbons, aliphatic hydrocarbons, alicyclic hydrocarbons and ethers are preferably used.

The ring-opened norbornene polymer of the present invention and its hydrogenation product have good resistance to chemicals, and thus, are insoluble or slightly soluble in some of the above-recited organic solvents. In the case where such solvents are used, the polymerization and hydrogenation are carried out in a state such that a polymer Is dispersed or partially dissolved in the reaction system. However, for the production of a polymer which has no melting point, and a hydrogenation product thereof which has a melting point, the polymerization and hydrogenation can also be carried out In a state such that a polymer is completely dissolved in the reaction system.

The amount of polymerization catalyst used is usually in the range of 1/100 to 1/2,000,000, preferably 1/500 to 1,000,000 and more preferably 1/1,000 to 1/500,000, as the ratio by mol of the transition metal in polymerization catalyst to the monomer When the amount of catalyst is too large, the removal of catalyst after polymerization becomes difficult. In contrast, with a too small amount of catalyst, the polymerization activity is poor.

Where the polymerization is carried out in a solvent, the concentration of monomer is preferably in the range of 1 to 50% by weight, more preferably 2 to 45% by weight and especially preferably 3 to 40% by weight. When the monomer concentration is too low, the productivity is reduced. In contrast, when the monomer concentration is too high, the as-polymerized reaction mixture exhibits a too high viscosity and becomes difficult to hydrogenate in the succeeding hydrogenation step.

The polymerization reaction is initiated by mixing of a monomer with a polymerization catalyst. The polymerization temperature is not particularly limited, but is usually in the range of −30° C. to 200° C. and preferably 0° C. to 180° C. The polymerization time also is not particularly limited, and can be chosen in the range of 1 minute to 100 hours.

To control the molecular weight of polymer, an appropriate amount of a vinyl compound or a diene compound can be added. As specific examples of the vinyl compound used as molecular weight modifier, there can be mentioned α-olefins such as 1-butene, 1-pentene, 1-hexene and 1-octene; styrene and its analogues such as styrene and vinyltoluene; ethers such as ethyl vinyl ether, isobutyl vinyl ether and allyl glycidyl ether; halogen-containing vinyl compounds such as allyl chloride; oxygen-containing vinyl compounds such as allyl acetate, allyl alcohol and glycidyl methacrylate; and nitrogen-containing vinyl compounds such as acrylamide. As specific examples of the diene compound, there can be mentioned non-conjugated dienes such as 1,4-pentadiene, 1,4-hexadiene, 1,5-hexadiene, 1,6-heptadiene, 2-methyl-1,4-pentadiene and 2,5-dimethyl-1,5-hexadiene; and conjugated dienes such as 1,3-butadiene, 2-methyl-1,3-butadiene, 2,3-dimethyl-1,3-butadiene, 1,3-pentadiene and 1,3-hexadiene. The amount of the vinyl compound or the diene compound can be appropriately chosen depending upon the particular molecular weight of polymer, and is usually in the range of 0.1% to 10% by mol.

The hydrogenation of a ring-opened norbornene polymer is carried out in the presence of a hydrogenation catalyst while hydrogen is fed into the reaction mixture. The hydrogenation catalyst is not particularly limited provided that it is widely used for hydrogenation of olefin compounds. The hydrogenation catalyst includes a homogeneous catalyst and a heterogeneous catalyst.

The homogeneous catalyst includes a catalyst comprising a combination of a transition metal compound with an alkali metal compound, and, as specific examples of the combination, there can be mentioned cobalt acetate/triethylaluminum, nickel acetylacetonato/triisobutylaluminum, titanocene dichloride/-n-butyllithium, zirconocene dichloride/sec-butyllithium and tetrabutoxy titanate/dimethylmagnesium. The homogeneous catalyst further includes noble metal complex catalysts such as dichlorobis(triphenylphosphine)palladium, chlorohydride-carbonyltris(triphenylphosphine)ruthenium and chlorotris-(triphenylphosphine)rhodium.

The heterogeneous catalyst includes solid catalysts comprised of a metal such as nickel, palladium, platinum, rhodium or ruthenium, or a metal selected from these metals, which is supported on a carrier such as carbon, silica, diatomaceous earth, aluminum or titanium oxide. As specific examples of the supported metal catalyst, there can be mentioned nickel/silica, nickel/diatomaceous earth, nickel/alumina, palladium/carbon, palladium/silica, palladium/diatomaceous earth and palladium/alumna.

The hydrogenation reaction is usually carried out in an inert organic solvent. As specific examples of the inert organic solvent, there can be mentioned aromatic hydrocarbons such as benzene and toluene; aliphatic hydrocarbons such as n-pentane and n-hexane; alicyclic hydrocarbons such as cyclohexane and decalin; and ethers such as tetrahydrofuran and ethylene glycol dimethyl ether. When the inert organic solvent is the same as the liquid medium used for polymerization, the hydrogenation reaction can be carried out by adding the hydrogenation catalyst to an as-polymerized polymerization mixture.

The hydrogenation conditions vary depending upon the particular hydrogenation catalyst used, but, the hydrogenation temperature is usually in the range of −20° C. to 250° C., preferably −10° C. to 220° C. and more preferably 0° C. to 200° C., and the hydrogen pressure is usually in the range of 0.1 to 50 kg/cm$^2$, preferably 0.5 to 40 kg/cm$^2$ and more preferably 1.0 to 30 kg/cm$^2$. When the hydrogenation temperature is too low, the rate of reaction is reduced. In contrast, when the hydrogenation temperature is too high, side reactions occur. When the hydrogen pressure is too low, the rate of hydrogenation is reduced. In contrast, when the hydrogen pressure is too high, a high-pressure-resistant reactor must be used.

The hydrogenation percentage is usually at least 50%, preferably at least 70%, more preferably at least 80% and especially preferably at least 90%. The desired hydrogenation percentage can be obtained in a hydrogenation time of 0.1 to 10 hours.

After completion of the ring-opening polymerization or the hydrogenation of polymer, a solvent which is poor solvent for the polymer is incorporated into a reaction liquid for recovery whereby the polymer is coagulated to obtain a ring-opened norbornene polymer or a hydrogenation product thereof, which has a high melting point. The coagulated polymer is easily separated by filtration from the reaction medium.

According to the need, various ingredients are incorporated in the ring-opened norbornene polymer or hydrogenation product thereof for use as a material for shaping.

As the ingredients, those which are generally used for plastic materials can be used. The ingredients include, for example, stabilizers such as an antioxidant, a heat stabilizer and a light stabilizer; an ultraviolet absorber, inorganic and organic fillers; a lubricant; a plasticizer; an antistatic agent; and a rubbery polymer.

The material for shaping can be prepared by kneading together the ring-opened polymer or hydrogenation product thereof and the above-recited ingredients usually at a temperature of 140° C. to 400° C. by using, for example, a twin-screw kneader, and then pelletizing the kneaded mixture by a pelletizer.

The shaping material is melt-shaped at a temperature of 140° C. to 400° C. by, for example, injection molding, extrusion shaping, blow-forming, injection blow-forming and press-shaping.

A curing agent, a curing accelerator and a curing auxiliary can be added to the ring-opened polymer or hydrogenation product thereof to render it into a thermosetting resin.

The shaping material can be shaped into an article of any desired form such as a spherical, rod-like, columnar, cylindrical, filmy or sheet-like, or fibrous form, and can be used in various fields in which general industrial plastics are used, such as material for parts of vehicles and marine structures; material for parts of aircrafts and aerospace instruments; material for electrical and electronic parts, such as insulation material for printed circuit boards, electronic part-encapsulating material, capacitor film, and connector; material for parts of industrial hardware and instruments including machine tools and medical instruments; packaging material for medical preparation or food; vessels such as a bottle and a vial; material for clothes, sports and leasure goods; piping material such as pipe, tube and joint; and material for precision parts such as coil-bobbin and gear.

Further, the ring-opened polymer or hydrogenation product thereof can also be used as reinforcer, modifier or other additives to be added in other materials.

The invention will now be more specifically described by the following examples and comparative examples. Parts and % in the examples and comparative examples are by weight unless otherwise specified.

(1) Molecular weight of a ring-opened polymer was measured by gel permeation chromatography (GPC) using chloroform as solvent and expressed in terms of polystyrene.

(2) Hydrogenation percentage was measured by infrared spectrophotometry.

(3) Melting point and glass transition temperature (Tg) were measured by differential scanning calorimeter (DSC) at a temperature elevation rate of 10° C./min.

EXAMPLE 1

0.0068 part of a molybdenum compound represented by the following formula (9):

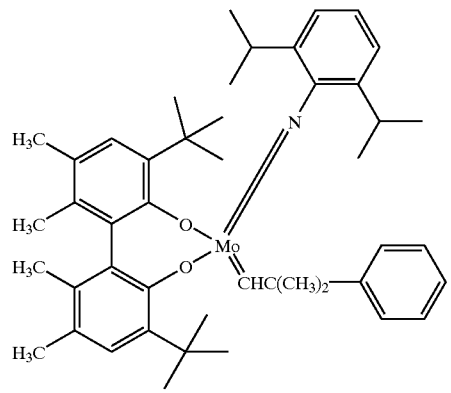

was placed in a glass reactor equipped with a stirrer. Then the reactor was charged with 24 parts of cyclohexane, 6 parts of dicyclopentadiene and 0.00573 part of 1-hexene, and polymerization was carried out at room temperature. Immediately after the commencement of polymerization, a white precipitate was produced. When the polymerization was carried out for 3 hours, a large amount of isopropanol was added to a polymerization liquid to coagulate a precipitate. The precipitate was separated by filtration and then vacuum-dried at 40° C. for 40 hours. Thus 5.5 parts of a ring-opened polymer was obtained. The polymer had a number average molecular weight (Mn) of 37,000 and a weight average molecular weight (Mw) of 103,000, as expressed in terms of polystyrene, and a melting point of 218° C.

EXAMPLE 2

An autoclave equipped with a stirrer was charged with 5 parts of the ring-opened polymer obtained in Example 1 and 88 parts of cyclohexane. Then, a hydrogenation catalyst solution prepared by dissolving 0.031 part of bis (tricyclohexyl-phosphine)benzylidyneruthenium(IV) dichloride and 1.8 parts of ethyl vinyl ether in 18 parts of cyclohexane was added. The hydrogenation reaction was carried out under a hydrogen pressure of 8 kg/cm$^2$ at 120° C. for 10 hours. After completion of the hydrogenation reaction, a large amount of isopropanol was poured into the reaction liquid to coagulate a white polymer. The polymer was separated by filtration and vacuum-dried at 40° C. for 40 hours. Infrared absorption spectrum showed no peak occurring due to carbon-carbon double bonds. Hydrogenation percentage was larger than 99%. The hydrogenated polymer product had a melting point of 272° C. The DSC chart is shown in FIG. 1.

To 100 parts of the hydrogenation product, 0.2 part of pentaerythrityl-tetrakis(3-(3,5-di-tert.butyl-4-hydroxyphenyl)propionate) as a hindered phenol antioxidant was incorporated, and the mixture was melt-kneaded at an average resin temperature of 320° C. by a twin-screw extruder. The kneaded mixture was made into a pellet by a pelletizer. The obtained shaping material in a pellet form was shaped into a plate of a name card size with a thickness of 3 mm plate by an injection molding machine at a cylinder temperature of 350° C.

The plate was left to stand in a Geer oven maintained at 200° C. for 150 hours. Distortion and other change in appearance were not observed. The plate was immersed in each of toluene, cyclohexane, tetrahydrofuran and xylene for 24 hours. Change in appearance such as swelling and dissolution was not observed.

Comparative Example 1

By the same procedures as described in Example 1, polymerization was carried out wherein 0.011 part of tungsten hexachloride, 0.026 part of tetrabutyltin and 0.01 part of dibutyl ether were used instead of the polymerization catalyst of formula (9) with all other conditions remaining the same. After completion of polymerization, the polymerization liquid was poured in a large amount of isopropanol to precipitate a polymer. Thus 5.8 parts of polymer was obtained. The polymer had Mn of 7,300 and MW of 18,200, as expressed In terms of polystyrene. Tg was observed at approximately 125° C. but the melting point was not observed.

Comparative Example 2

By the same procedures as described in Example 2, the polymer obtained in Comparative Example 1 was hydrogenated. The hydrogenation reaction liquid was poured in a large amount of isopropanol to precipitate a polymer. The hydrogenation percentage was larger than 99%. Tg was observed at approximately 97° C. but the melting point was not observed.

Comparative Example 3

By the same procedures as described in Example 1, polymerization was carried out wherein bis(tricyclohexyl-phosphine)benzylidyneruthenium(IV) dichloride was used instead of the polymerization catalyst of formula (9) with all other conditions remaining the same. After completion of polymerization, the polymerization liquid was poured in a large amount of isopropanol to precipitate a polymer. The polymer was completely insoluble in toluene and tetrahydrofuran, and its melting point was not observed.

Comparative Example 4

By the same procedures as described in Example 2, the polymer obtained in Comparative Example 3 was hydrogenated wherein toluene was used as solvent instead of cyclohexane with all other conditions remaining the same. The hydrogenation reaction liquid was poured in a large amount of isopropanol to precipitate a polymer. The hydrogenation percentage was larger than 99%. Tg was observed at approximately 91° C. but the melting point was not observed.

Comparative Example 5

By the same procedures as described in Example 1, polymerization was carried out wherein 2,6-diisopropylphenylimideneophylidenemolybdenum (VI) bis(hexafluoro-t-butoxide) was used instead of the polymerization catalyst of formula (9) with all other conditions remaining the same. After completion of polymerization, the polymerization liquid was poured in a large amount of isopropanol to precipitate a polymer. Thus 5.4 parts of polymer was obtained. The polymer had Mn of 8,900 and MW of 16,800, as expressed in terms of polystyrene. Tg was observed at 140° C. but the melting point was not observed.

EXAMPLE 3

By the same procedures as described in Example 1, polymerization was carried out wherein 3 parts of dicyclopentadiene and 3 parts of 2-norbornene were used instead of 6 parts of dicyclopentadiene with all other conditions remaining the same. The obtained ring-opened polymer had Mn of 33,900 and Mw of 83,100, as expressed in terms of polystyrene.

The polymer was hydrogenated in the same manner as in Example 2 to obtain a hydrogenation product. Infrared absorption spectrum showed no peak occurring due to carbon-carbon double bonds. Hydrogenation percentage was larger than 99%. The hydrogenated product had a melting point of 252° C. A plate was shaped from the hydrogenated product and its properties were evaluated in the same manner as in Example 1. The results were the same as in Example 1.

EXAMPLE 4

0.0068 part of a molybdenum compound of formula (9) was placed in a glass reactor equipped with a stirrer. Then the reactor was charged with 24 parts of cyclohexane, 6 parts of norbornene and 0.00573 part of 1-hexene, and polymerization was carried out at room temperature. When the polymerization was carried out for 3 hours, a large amount of isopropanol was added to a polymerization liquid to coagulate a precipitate. The precipitate was separated by filtration and then vacuum-dried at 40° C. for 40 hours. Thus 5.5 parts of a ring-opened polymer was obtained. The polymer had a number average molecular weight (Mn) of 27,000 and a weight average molecular weight (Mw) of 82,000, as expressed in terms of polystyrene.

An autoclave equipped with a stirrer was charged with 5 parts of the above polymer and 88 parts of cyclohexane. Then, a hydrogenation catalyst solution prepared by dissolving 0.031 part of bis(tricyclohexylphosphine)benzylidyneruthenium(IV) dichloride and 1.8 parts of ethyl vinyl ether in 18 parts of cyclohexane was added. The hydrogenation reaction was carried out under a hydrogen pressure of 8 kg/cm$^2$ at 120° C. for 10 hours. A large amount of isopropanol was poured into the reaction liquid to coagulate a polymer. The polymer was separated by filtration and vacuum-dried at 40° C. for 40 hours. Hydrogenation percentage was larger than 99%. The hydrogenated polymer product had a melting point (Tm) of 172° C. as measured by DSC.

Comparative Example 6

By the same procedures as described in Example 4, polymerization was carried out wherein 0.011 part of tungsten hexachloride, 0.026 part of tetrabutyltin and 0.01 part of dibutyl ether were used instead of the polymerization catalyst of formula (9) with all other conditions remaining the same. After completion of polymerization, the polymerization liquid was poured in a large amount of isopropanol to precipitate a polymer. Thus 5.8 parts of polymer was obtained. The polymer had Mn of 8,100 and Mw of 19,100, as expressed in terms of polystyrene.

The polymer was hydrogenated In the same manner as in Example 4. The hydrogenation reaction liquid was poured in a large amount of isopropanol to precipitate a polymer. The hydrogenation percentage was larger than 99%. The melting point (Tm) of the hydrogenation product was 104° C.

Comparative Example 7

By the same procedures as described in Example 4, polymerization was carried out wherein 2,6-diisopropylphenylimideneophylidenemolybdenum(VI) bis(hexafluoro-t-butoxide) was used instead of the polymerization catalyst of formula (9) with all other conditions remaining the same, After completion of polymerization, the polymerization liquid was poured in a large amount of isopropanol to precipitate a polymer. Thus 5.8 parts of a ring-opened polymer was obtained.

The polymer was hydrogenated in the same manner as in Example 4 wherein toluene was used as a solvent instead of cyclohexane. The hydrogenation reaction liquid was poured in a large amount of isopropanol to precipitate a polymer. The hydrogenation percentage was larger than 99%. The melting point (Tm) of the hydrogenation product was 106° C.

EXAMPLE 5

By the same procedures as described in Example 1, polymerization was carried out wherein 0.0075 part of a molybdenum compound represented by the following formula (10) was used instead of the polymerization catalyst of formula (9) with all other conditions remaining the same. The obtained polymer had Mn of 22,400 and Mw of 51,500.

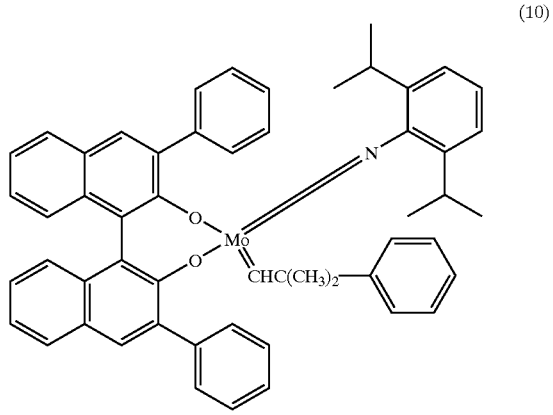

(10)

An autoclave equipped with a stirrer was charged with 5 parts of the above-obtained polymer and 88 parts of cyclohexane. Then, a hydrogenation catalyst solution prepared by dissolving 0.05 part of nickel acetylacetomato and 0.2 part of triisobutylaluminum in 18 parts of cyclohexane was added. The hydrogenation reaction was carried out under a hydrogen pressure of 8 kg/cm$^2$ at 120° C. for 10 hours. A large amount of isopropanol was poured into the reaction liquid to coagulate a polymer. The polymer was separated by filtration and vacuum-dried at 40° C. for 40 hours. Hydrogenation percentage was larger than 99%. The hydrogenated polymer product had a melting point (Tm) of 218° C. as measured by DSC.

EXAMPLE 6

By the same procedures as described in Example 1, polymerization was carried out wherein 2,6-diisopropylphenylimideneophylidenemolybdenum(VI) bis(hexafluoro-t-butoxide) was used instead of the polymerization catalyst of formula (9) with all other conditions remaining the same. After completion of polymerization, the polymerization liquid was poured in a large amount of isopropanol to precipitate a polymer. Thus 5.4 parts of a ring-opened polymer was obtained. The melting point was not observed.

The ring-opened polymer was hydrogenated in the same manner as in Example 2 wherein 0.02 part of chlorotris(triphenylphosphine)rhodium was used as hydrogenation catalyst with all other conditions remaining the same. Hydrogenation percentage was larger than 99%. The hydrogenated product had a melting point of 220° C.

As seen from the comparison of examples with comparative examples, ring-opened norbornene polymers of the present invention and hydrogenation products thereof had a melting point in contrast with those obtained in comparative examples. The hydrogenation product having a melting point of 140° C. or higher was confirmed to possess excellent processability and shapability, heat resistance and solvent resistance.

Industrial Applicability

According to the present invention, a crystalline ring-opened norbornene polymer having a melting point and a crystalline hydrogenation product of a ring-opened norbornene polymer having a melting point are provided. This crystalline ring-opened norbornene polymer and the crystalline hydrogenation product are capable of being melt-shaped by, for example, injection molding or extrusion shaping, to give a shaped article having high mechanical strength, chemical resistance and heat resistance. Thus, the polymer and its hydrogenation product are used as shaping material for various fields.

What is claimed is:

1. A ring-opened norbornene polymer comprising at least 10% by mol of repeating units derived from a polycyclic norbornene monomer having at least three rings, in the repeating units of the polymer, said polymer having a weight average molecular weight in the range of 500 to 1,000,000 as measured by gel permeation chromatography and expressed in terms of polystyrene, and having a melting point.

2. The polymer according to claim 1, wherein the melting point is in the range of 140° C. to 400° C.

3. The polymer according to claim 1, wherein the repeating units derived from the polycyclic norbornene monomer are represented by the following general formula (1) or (2):

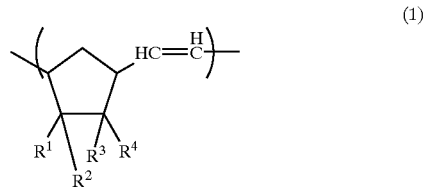

(1)

-continued

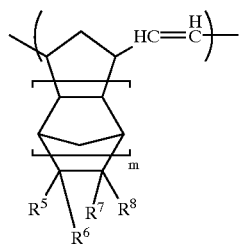
(2)

wherein R¹ through R⁸ independently represent a hydrogen atom or a hydrocarbon group, R¹ and R³ are bonded together to form a ring and R⁵ and R⁷ may be bonded together to form a ring, and m is an integer of 1 or 2.

4. The polymer according to claim 1, wherein the repeating units derived from a polycyclic norbornene monomer are units derived from dicyclopentadiene.

5. A process for producing a ring-opened norbornene polymer claimed in claim 1, which comprises polymerizing a polycyclic norbornene monomer by using a polymerization catalyst comprising as a main ingredient a metal compound containing a transition metal of group 6 of the periodic table and having at least one imide group and at least two substituents (A) selected from the group consisting of an alkoxy group, an aryloxy group, an alkylamide group and an arylamide group, said two substituents (A) being bonded to each other.

6. The process for producing a ring-opened norbornene polymer according to claim 5, wherein the polycyclic norbornene monomer is represented by the following general formula (6) or (7):

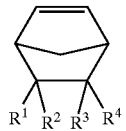
(6)

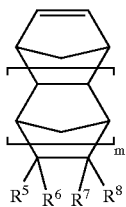
(7)

wherein R¹ through R⁸ independently represent a hydrogen atom or a hydrocarbon group, R¹ and R³ are bonded together to form a ring and R⁵ and R⁷ may be bonded together to form a ring, and m is an integer of 1 or 2.

7. The process for producing a ring-opened norbornene polymer according to claim 5, wherein the substituents (A) are an aryloxy group.

8. The process for producing a ring-opened norbornene polymer according to claim 5, wherein the polymerization catalyst is represented by the following formula (9) or (10):

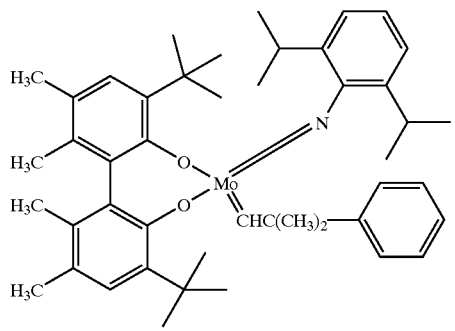
(9)

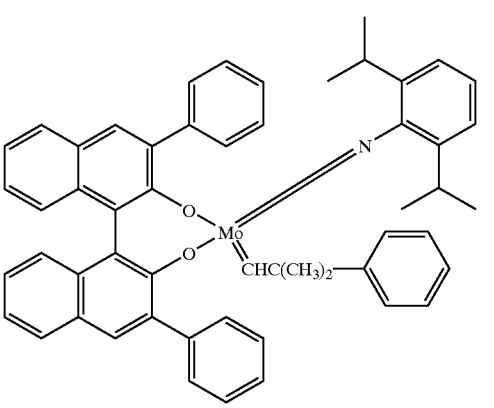
(10)

9. A hydrogenation product of a ring-opened norbornene polymer obtained by hydrogenating a ring-opened norbornene polymer comprising repeating units derived from a polycyclic norbornene monomer, said hydrogenation product having a weight average molecular weight in the range of 500 to 1,000,000 as measured by gel permeation chromatography and expressed in terms of polystyrene, and having a melting point of 140° C. or higher.

10. A process for producing a hydrogenation product of a ring-opened norbornene polymer as claimed in claim 9, which comprises the steps of:

polymerizing a polycyclic norbornene monomer by using a polymerization catalyst comprising as a main ingredient a metal compound containing a transition metal of group 6 of the periodic table and having at least one imide group and at least one substituent (A) selected from the group consisting of an alkoxy group, an aryloxy group, an alkylamide group and an arylamide group, to give a ring-opened norbornene polymer; and hydrogenating carbon-carbon double bonds in the ring-opened norbornene polymer by using hydrogen and a hydrogenation catalyst.

11. The process for producing a hydrogenation product of a ring-opened norbornene polymer according to claim 10, wherein the polymerization catalyst has substituents (A) bonded to each other.

12. The process for producing a hydrogenation product of a ring-opened norbornene polymer according to claim 10, wherein the substituents (A) are an aryloxy group.

13. A hydrogenation product of a ring-opened norbornene polymer obtained by hydrogenating a ring-opened norbornene polymer comprising at least 10% by mol of repeating units derived from a polycyclic norbornene monomer having at least three rings, in the repeating units of the polymer; said hydrogenation product having a weight average molecular weight in the range of 500 to 1,000,000 as measured by gel permeation chromatography and expressed in terms of polystyrene, and having a melting point.

14. The hydrogenation product of a ring-opened norbornene polymer according to claim 13, wherein the melting point is in the range of 140° C. to 400° C.

15. The hydrogenation product of a ring-opened norbornene polymer according to claim 13, wherein the repeating units derived from the polycyclic norbornene monomer are represented by the following general formula (1) or (2):

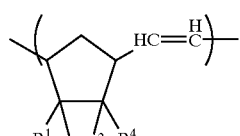

(1)

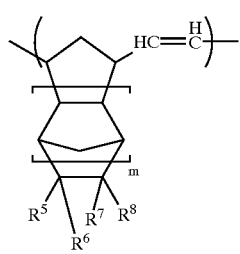

(2)

wherein $R^1$ through $R^8$ independently represent a hydrogen atom or a hydrocarbon group, $R^1$ and $R^3$ are bonded together to form a ring and $R^5$ and $R^7$ may be bonded together to form a ring, and m is an integer of 1 or 2.

16. The hydrogenation product of a ring-opened norbornene polymer according to claim 13, wherein the repeating units derived from a polycyclic norbornene monomer are units derived from dicyclopentadiene.

17. A process for producing a hydrogenation product of a ring-opened norbornene polymer as claimed in claim 13, which comprises the steps of:

polymerizing a polycyclic norbornene monomer by using a polymerization catalyst comprising as a main ingredient a metal compound containing a transition metal of group 6 of the periodic table and having at least one imide group and at least one substituent (A) selected from the group consisting of an alkoxy group, an aryloxy group, an alkylamide group and an arylamide group, to give a ring-opened norbornene polymer; and hydrogenating carbon-carbon double bonds in the ring-opened norbornene polymer by using hydrogen and a hydrogenation catalyst.

18. The process for producing a hydrogenation product of a ring-opened norbornene polymer according to claim 17, wherein the polymerization catalyst has substituents (A) bonded to each other.

19. The process for producing a hydrogenation product of a ring-opened norbornene polymer according to claim 17, wherein the substituents (A) are an aryloxy group.

20. The process for producing a hydrogenation product of a ring-opened norbornene polymer according to claim 17, wherein the polymerization catalyst is represented by the following formula (9) or (10):

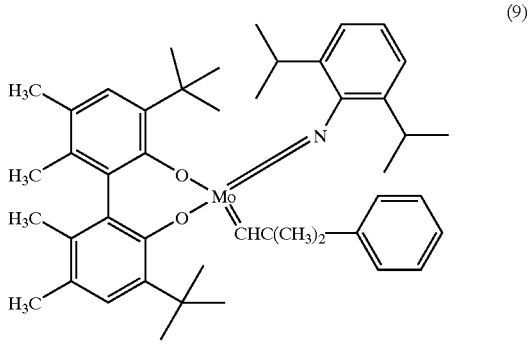

(9)

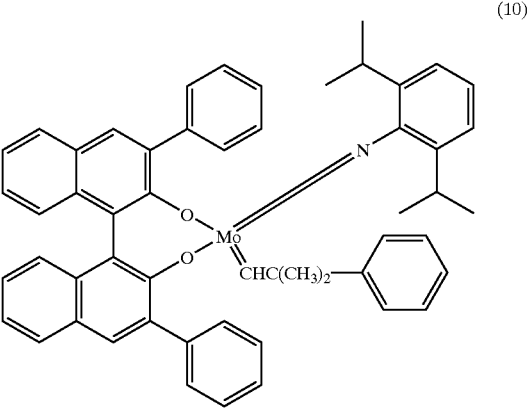

(10)

21. The process for producing a hydrogenation product of a ring-opened norbornene polymer according to claim 17, wherein the hydrogenation catalyst contains a metal selected from rhodium, palladium, nickel and ruthenium.

22. The process for producing a hydrogenation product of a ring-opened norbornene polymer according to claim 17, wherein the polycyclic norbornene monomer is represented by the following general formula (6) or (7):

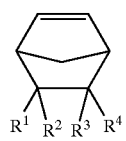

(6)

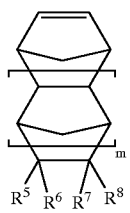

(7)

wherein $R^1$ through $R^8$ independently represent a hydrogen atom or a hydrocarbon group, $R^1$ and $R^3$ are bonded together to form a ring and $R^5$ and $R^7$ may be bonded together to form a ring, and m is an integer of 1 or 2.

23. A hydrogenation product of a ring-opened norbornene polymer obtained by hydrogenating a ring-opened norbornene polymer comprising repeating units derived from a polycyclic norbornene monomer having two rings, in the repeating units of the polymer; said hydrogenation product having a weight average molecular weight in the range of 500 to 1,000,000 as measured by gel permeation chromatography and expressed in terms of polystyrene, and having a melting point of 140° C. or higher.

24. A process for producing a hydrogenation product of a ring-opened norbornene polymer as claimed in claim 23, which comprises the steps of:

polymerizing a polycyclic norbornene monomer by using a polymerization catalyst comprising as a main ingredient a metal compound containing a transition metal of group 6 of the periodic table and having at least one imide group and at least one substituent (A) selected from the group consisting of an alkoxy group, an aryloxy group, an alkylamide group and an arylamide group, to give a ring-opened norbornene polymer; and hydrogenating carbon-carbon double bonds in the ring-opened norbornene polymer by using hydrogen and a hydrogenation catalyst.

25. The process for producing a hydrogenation product of a ring-opened norbornene polymer according to claim 24, wherein the polymerization catalyst has substituents (A) bonded to each other.

26. The process for producing a hydrogenation product of a ring-opened norbornene polymer according to claim 24, wherein the substituents (A) are an aryloxy group.

* * * * *